(No Model.)
W. A. SHAW.
SECONDARY BATTERY.
No. 309,886. Patented Dec. 30, 1884.
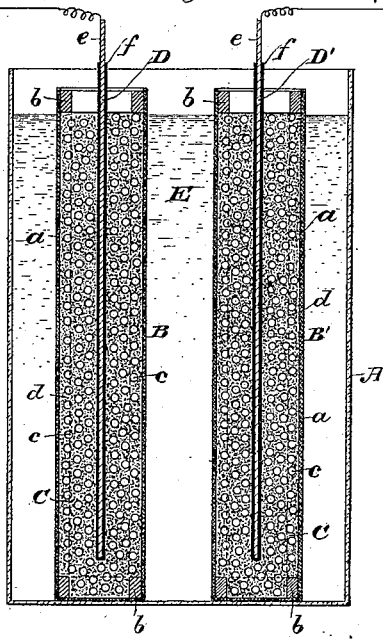
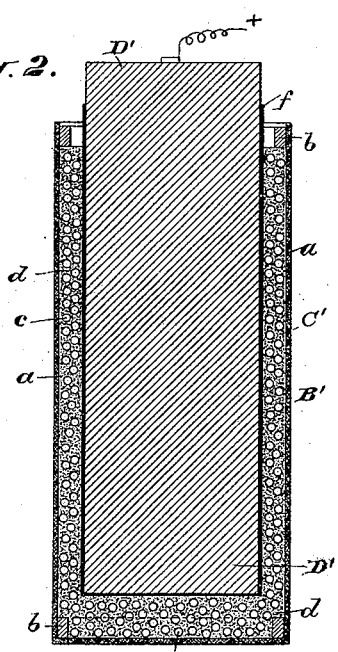
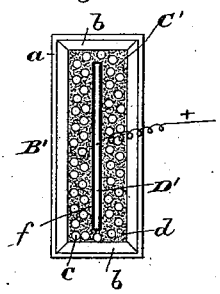
Attest:
Geo. T. Smallwood.
Philip Mauro
Inventor:
Wm Anthony Shaw
by A. Pollok
his attorney.

UNITED STATES PATENT OFFICE.

WILLIAM ANTHONY SHAW, OF PITTSBURG, PENNSYLVANIA, ASSIGNOR TO THE ELECTRICAL ACCUMULATOR COMPANY, OF NEW YORK, N. Y.

SECONDARY BATTERY.

SPECIFICATION forming part of Letters Patent No. 309,886, dated December 30, 1884.

Application filed June 25, 1883. (No model.)

*To all whom it may concern:*

Be it known that I, WILLIAM ANTHONY SHAW, of Pittsburg, in the county of Allegheny and State of Pennsylvania, (formerly of Brooklyn, Kings county, New York,) have invented a new and useful Improvement in Secondary Batteries, which improvement is fully set forth in the following specification.

This invention, although not wholly limited thereto, has more particular reference to batteries in which the active material of one or more plates or elements of the couples is insoluble in the exciting-liquid or electrolyte, and therefore is not alternately dissolved and precipitated, but remains attached to the body of its plate or element.

The invention consists, first, in a retaining-case of perforate or porous fabric stretched upon a frame of wood or similar stiff material for holding in an upright position the said active material, which is usually more or less porous, granular, or pulverulent, and liable to fall down if not exteriorly supported. A conductor is or may be introduced into the middle of the case, and is surrounded with the active material. The advantage of this case is its lightness, small cost, efficiency, and that it supports the active material independently of the conductor.

The invention, secondly, consists in using as the principle active portion of a plate or element small particles of solid metal—such as shot or beads of lead, for example—coated, incrusted, enveloped, or mixed in with a metallic oxide, salt, or reducible compound, or with finely-divided metal, or metal in a porous or pulverulent condition. A very large active surface with good conductivity is thus secured.

The invention, thirdly, consists in a conductor of metal provided with an adherent protective coating of a conductive and non-corrodible material—such as carbon, and specially lamp-black—in combination with active material applied to or enveloping the same. The metal of the conductor is protected by the carbon coating from being attacked by the battery-liquid in the operation of the battery. Copper or similar cheap metal of good conductivity may be and is preferably employed.

The invention, fourthly, consists in compressing the body of solid metal particles coated, incrusted, enveloped, or mixed with the active material, as aforesaid; and it also comprises the particular constructions of elements or plates hereinafter set forth.

The following description will enable those skilled in the art to which the invention relates to make and use the same, reference being had to the accompanying drawings, which form a part of this specification.

Figure 1 is a vertical section through a cell of battery constructed in accordance with the invention; Fig. 2, a vertical section, in a plane at right angles to that of Fig. 1, through one of the elements or plates; and Fig. 3, a plan of said element or plate.

A is the containing-vessel, of glass or other suitable material; B B', the porous retaining-cases of the two plates or elements; C C', the principal active portions thereof; D D', the conductors, and E the exciting-liquor or electrolyte.

The retaining-cases B B' each comprise fabric $a$, stretched over a frame, $b$, of wood or other stiff material. As shown, the frame consists of light strips fastened or jointed together at their ends, there being four horizontal strips at the top and four at the bottom, and four uprights at the corners. The fabric may be felt or flannel, or other porous or perforate fabric. It is not necessary that it should be textile fabric, although this is preferred. The active portion C or C' of each plate or element consists of small particles $c$ of solid metal—such as lead shot, (say No. 6) or beads, or the like—coated, incrusted, or mixed with material $d$ in a porous or pulverulent condition, or condition adapted readily to become porous, preferably red lead, although other oxide salt or compound, or even finely divided or porous metal, may be used.

Shot may readily be coated by rolling in a paste of red lead mixed or ground with sulphuric acid.

The conductors D D' consist each of a metal plate, $e$, preferably of copper, although iron or other metal may be used, coated with an adherent layer, $f$, of carbon, preferably lamp-black, made into a paste with sulphuric acid, as described in my application for improvement in electric batteries, filed March 24, 1882, and applied with a trowel or otherwise. The lamp-black hardens and forms an adherent protective coating. The conductor may be otherwise coated with carbon. The conductors being placed in the retaining-case, the shot and red lead, or their substitutes, are filled in and pressed down and around the same. The composite material of the active portion may also be compressed under heavy pressure in suitable molds around the conductor, and the whole in the form of a brick then placed in its case. The elements or plates thus formed are placed in the containing-vessel A, which is filled to the proper height with a solution of sulphuric acid in water—say, ten parts, by weight, of acid to ninety parts water—or other suitable exciting-liquid or electrolyte. The conductors of the two elements are connected with a suitable generator, and a current passed through it. This current reduces to metallic lead the red lead or its substitute in the positive element or elements connected with the negative pole of the primary generator, and oxidizes it to its fullest extent, the porous metal and exposed metallic surfaces of the negative element or element connected with the positive pole of the charging-generator.

In order to bring the elements into working order, the connection with the charging-generator may be reversed so as successively to peroxidize and reduce the metal or each plate or element; but this is not essential. Frequent reversals are not desirable.

Modifications may be made in the details without departing from the spirit of the invention, and parts of the invention may be used separately. For example, the mixture of shot and red lead or their substitutes may be placed in any suitable retaining-vessel—such as a porous cup of baked earthenware, or in a plain bag or box with perforated sides—and when sufficiently compressed may be used without a retaining-case.

The conductors may be of various kinds. I have myself used lead in place of the carbon-coated copper. I have also applied a coating of red lead to a copper or lead plate, and embedded or surrounded it in the shot and red lead.

The use of shot and red lead or like material in a bag or retaining-case is taken from my application for improvement in secondary batteries, filed April 14, 1882, No. 58,313, and the present application may be considered, therefore, as in part a continuation thereof.

For a number of substitutes for red lead, reference may be had to my said application. I have also mixed nitrate of soda or potash with the active material, and have placed between the elements a mixture of a solid salt and earthy or porous inert material, as described in my said application.

Instead of dilute sulphuric acid, other suitable excitant can be used—for example, a saturated solution of an alkaline nitrate, (nitrate of potash is best,) as a solution of bichromate of potash, and others.

It is evident that an element such as described can be used in connection with a plain plate of lead, copper, carbon, or other conducting material as the opposing (usually positive) element, and also that the containing-vessel may be of metal and constitute the opposing element of the couple.

Having thus fully described my said invention and the manner of carrying the same into effect, what I claim is—

1. In a secondary cell or couple, and in combination with porous, granular, or pulverulent active material of an element thereof, a retaining-case of perforate or porous fabric stretched on a frame of wood or similar material for holding the said active material, substantially as described.

2. The positive or negative element of a secondary couple or cell, composed of a retaining-case of perforate or porous fabric stretched upon a frame of wood or similar material, active material in a porous granular or pulverulent condition within said case, and a conductor embedded in said active material, substantially as described.

3. In the element of a secondary couple or cell, an active portion of lead shot or other small particles of solid metal mixed with active material in a porous or pulverulent condition, substantially as described.

4. The positive or negative element of a secondary cell or couple, composed of an active portion of small metal particles surrounded by porous or pulverulent active material, a conductor, and a porous retaining-case, substantially as described.

5. In the negative or positive element of a secondary cell or couple, a conductor of metal protected with an adherent protective coating of conducting material—such as lamp-black or other carbon—in combination with the active material surrounding or in contact with said conductor, substantially as described.

6. The negative or positive element of a secondary cell or couple, composed of a conductor of copper or other metal protected with an adherent coating of conducting and non-corrodible substance—such as lamp-black, for example—a body of active material, and a porous retaining-case, substantially as described.

7. The negative or positive element of a secondary cell or couple, composed of a carbon-coated metallic conductor, an active portion of metallic particles—such as shot or beads of lead—coated, incrusted, enveloped, or mixed with porous or pulverulent material—such as red lead or its specified substitute—and a retaining-case of porous or perforate fabric stretched upon a frame of wood or like material, substantially as described.

In testimony whereof I have signed this specification in the presence of two subscribing witnesses.

WM. ANTHONY SHAW.

Witnesses:
A. POLLOK,
PHILIP MAURO.